3,072,491
PROCESS FOR PREPARING HIGH TEMPERATURE-SHORT TIME STERILIZED CONCENTRATED MILK PRODUCTS

Abraham Leviton, Washington, D.C., and Michael J. Pallansch, Vienna, Va., assignors to the United States of America as represented by the Secretary of Agriculture
No Drawing. Filed Nov. 14, 1960, Ser. No. 69,238
16 Claims. (Cl. 99—212)
(Granted under Title 35, U.S. Code (1952), sec. 266)

A non-exclusive, irrevocable, royalty-free license in the invention herein described throughout the world for all purposes of the United States Government, with the power to grant sublicenses for such purposes, is hereby granted to the Government of the United States of America.

This invention relates to a process for preparing concentrated milk products, and particularly relates to a process for preparing concentrated milk products with improved heat stability and storage life.

Sterile concentrated milk products such as evaporated milk are ordinarily prepared by concentrating normal or modified fluid milk to produce a concenrate of the desired content of total solids and the desired ratio between fat and total solids, preferably homogenizing at some point in the preparation of the concentrate, packaging the concentrate in cans or bottles, and sterilizing the packaged concentrate with heat.

There are well-recognized liabilities in the sterile milk products prepared by previously developed processes. It is known that the use of high temperatures and short times of sterilization results in sufficient destruction of contaminating organisms without the unwanted side-effects of imparting off-color and off-flavors and of heat coagulation which may occur with the long heating period required if lower sterilizing temperatures are used.

The method of sterilizing at about 280° F. (137° C.) with a holding period of about 5 to 15 seconds, usually packaging after rather than before sterilization, is an example of the high temperature-short time (HTST) method. While the use of slightly lower temperatures with slightly longer holding times also falls into the category of an HTST method, an important consideration in all HTST methods is rapid heating to desired temperature and rapid cooling after sterilization. Equipment being available better control is obtained by sterilizing, cooling and then packaging by aseptic procedures instead of packaging and then sterilizing.

Both the color and flavor attributes of freshly prepared HTST sterilized concentrated milks compare favorably with the corresponding attributes of market milk. The HTST method would be preferable to the "long-hold" procedure were it not for the tendency of the HTST sterilized milk concentrate to develop a gel-like structure on storage at room temperature.

Gelling manifests itself in a characteristic manner. A storage period in which viscosity usually increases is followed by one in which the viscosity remains fairly steady. Finally, a period is observed in which the viscosity rises, slowly at first, then more rapidly, until the concentrated milk, instead of flowing freely, begins to move as a body possessing a liver-like consistency. The soft body gradually gives way to a firm one, inhomogeneities appear and syneresis (exudation of milk serum) may be observed.

An object of the present invention is to provide a sterilized concentrated milk product which is stable in storage for long periods of time against gel formation and stratification. Another object of the present invention is to render feasible the employment of an HTST method of sterilization in the preparation of a sterilized concentrated milk product. Other objects and a fuller understanding of the invention may be had by referring to the following description and claims.

According to the present invention high temperature-short time sterilized concentrated milk product of improved storage stability is prepared by a process comprising incorporating in the high temperature-short time sterilized concentrated milk product about from 5 to 25% by weight of final concentrated product a polyhydric compound such as a hexose, a corresponding polyhydric alcohol of a hexose, and a disaccharide. When the polyhydric compound is a hexose, for example, dextrose, levulose or galactose, or a corresponding polyhydric alcohol such as sorbitol or mannitol, the preferred range of amount of incorporated additive is about from 10 to 25% by weight, When the additive is a disaccharide such as lactose, sucrose, or maltose, the amount preferred is in the range of about from 5 to 18% by weight.

The improvement consists essentially in prolonging the time required for gel-structure to develop and in eliminating the formation during storage of macroscopically visible curd particles. Since macroscopically visible curd particles do not form during storage in the HTST sterilized concentrated milk products of the present process, the defect known as "graininess" is eliminated, and these products even after they develop structure may be "stirred-out" to yield free flowing liquids which do not contain macroscopically visible curd particles or grains.

The HTST sterilized concentrated milk products of the present invention are demonstrated to have an increased storage life of from about 50% to more than 100% longer than that of control concentrated milk in which no polyhydric compound was dispersed. Moreover, coagulation in the milk product did not occur. It is to be understood that the improvements are not limited to the specific polyhydric compounds disclosed herein, but that other carbohydrates and polyhydric alcohols are also capable of producing increases in storage life of HTST sterilized concentrated milk products.

In a preferred embodiment of the present invention the combining of the polyhydric compound and the milk is included in a process for making optimum quality HTST sterilized concentrated milk, such a process usually including forewarming the milk, concentrating the forewarmed milk, homogenizing the concentrated forewarmed milk, and sterilizing and packaging the concentrated milk by an HTST method.

In mixing the polyhydric compound with the milk the important considerations are that the polyhydric compound become dissolved in and substantially uniformly dispersed throughout the milk product. While the particular means of achieving these results are immaterial to the invention, from a practical viewpoint the mixing should be effected prior to sterilization. A convenient procedure is to mix the polyhydric compound with the milk at the beginning of the process.

The inventive process, illustrated with improvement of storage life of sterilized concentrated skim milk, is equally applicable to HTST sterilized concentrated whole milk products, including conventional concentrations and those with various proportions of fat content.

In demonstrating the present invention a storage temperature of 30° C. was selected and viscosity measurements were made at this temperature. Improvement in stability of the milk products is considered as applicable to all storage conditions.

The storage life of a sample is taken as the time required for the "stirred-out" viscosity to reach a value which is twice the minimum viscosity observed during storage. The "stirred-out" viscosity is defined as the viscosity of a sample after the position of the sample in a capillary tube has been reversed twice by the application of centrifugal force.

Viscosity measurements were made in bomb microviscometers fabricated from thin-walled capillary tubing and containing a small glass bead within the tubing. Viscosity ("stirred-out") measurements were determined at 30° C. with the viscometers inclined at an angle of approximately 10° to the vertical by measuring the time of transit of the glass bead between two marks on the microviscometer. Viscosity values were calculated and recorded as centipoises.

The practice of this invention is illustrated by the following example.

EXAMPLE 1

From a skim milk containing 9.4% solids, 4 series of milks were prepared A, B, C, and D. One sample in series A and C served as controls. To three samples in each of series A, B, C, and D, quantities of lactose, dextrose, sucrose and sorbitol were added respectively to yield in turn milks containing 5.2, 10.4 and 15.6 grams additive per 100 grams skim milk. All milks were forewarmed at about 100° C. for 17 minutes under an atmosphere of nitrogen, and concentrated in vacuo to contain 19.2% skim milk solids and varying concentrations (0, 9.6, 17.5 and 24.5 g. per 100 g. concentrates) of additives. Loaded into capillary bomb microviscometers, all samples were sterilized at 280° F. (137.4° C.) for 15 seconds, cooled to room temperature and stored at 30° C. During storage, the samples were rotated to retard sedimentation. Viscosity measurements were made periodically during a six month storage period and samples were examined at the same time for evidence of graininess, coagulation and structure formation. The results are tabulated in Table 1.

All samples containing additive showed no evidence of graininess after a storage period of 6 months. Control samples deteriorated in body after 109–125 days showing marked evidence of coagulation. Samples containing about 10% additive (the original milk contained 5.2 g. additive per 100 g. milk) had a minimum shelf life of about 6 months and no coagulation occurred even after a period of 190 days. Increasing the concentration of additive brought about variations in shelf life dependent in some manner upon the specific properties of the additive. Thus added lactose and sucrose exerted a maximum stabilizing effect when the concentrate contained about 17.5 g. added lactose per 100 g. concentrate; added dextrose and sorbitol when the quantity added was about 24.5 g. or more per 100 g. concentrate. Contrariwise added lactose exerted no stabilizing influence when the quantity added was about 24.5 g. per 100 ml. concentrate; and sucrose exerted very little influence under the same conditions. Concentrate containing about 17.5 g. sorbitol or more per 100 g. concentrated milk were remarkably stable showing very little increase in viscosity after 6 months' storage. Concentrates containing about 17.5 g. and 24.5 g. dextrose per 100 ml. concentrated milk product, while showing a quite slow rise in viscosity during a period of 5 months, changed very little thereafter.

Table 1

STORAGE LIFE OF SKIM MILK CONCENTRATE (19.2% MILK SOLIDS) WITH AND WITHOUT ADDED SUGAR AND SORBITOL

| Additive | Concentration, g. per 100 g. Concentrated Product | Viscosity Before Sterilization, Centipoises | Viscosity After Sterilization, Centipoises | Storage Life, Days | Remarks |
|---|---|---|---|---|---|
| Lactose | 0 | 2.8 | 3.0 | 111 | Coagulation after 124 days. |
| Do | 9.6 | 3.1 | 3.4 | 180 | No coagulation after 190 days. |
| Do | 17.5 | 4.2 | 4.4 | >180 | Do. |
| Do | 24.2 | 5.3 | 5.7 | 110 | Do. |
| Dextrose | 9.6 | 3.4 | 3.4 | 175 | Do. |
| Do | 17.5 | 4.2 | 4.2 | 145 | Do. |
| Do | 24.2 | 5.2 | 5.3 | >180 | Do. |
| Sucrose | 0 | 2.8 | 3.1 | 98 | Coagulation after 109 days. |
| Do | 9.6 | 3.5 | 3.8 | >180 | No coagulation after 190 days. |
| Do | 17.5 | 4.5 | 4.5 | >180 | Do. |
| Do | 24.2 | 5.7 | 5.7 | 144 | Do. |
| Sorbitol | 9.6 | 3.2 | 3.1 | 172 | Do. |
| Do | 17.5 | 4.0 | 3.8 | >180 | Do. |
| Do | 24.2 | 5.1 | 4.8 | >180 | Do. |

We claim:

1. A process comprising dispersing in a milk a polyhydric compound selected from the group consisting of (a), (b), and (c) in which (a) is about from 10 to 25% by weight, based on weight of final product, of a hexose, (b) is about 10 to 25% by weight, based on weight of final product, of the corresponding alcohol of a hexose, and (c) is about from 5 to 18% by weight, based on weight of final product of a disaccharide, to give a milk product, forewarming the milk product, concentrating the forewarmed milk product, and sterilizing and packaging the concentrated milk product by a high temperature-short time method to give as a final product a packaged sterilized concentrated milk product of improved storage stability.

2. The process of claim 1 in which the polyhydric compound is a hexose.

3. The process of claim 2 in which the hexose is dextrose.

4. The process of claim 1 in which the polyhydric compound is a disaccharide.

5. The process of claim 4 in which the disaccharide is lactose.

6. The process of claim 4 in which the disaccharide is sucrose.

7. A process comprising dispersing in a milk a polyhydric compound selected from the group consisting of (a), (b), and (c) in which (a) is about from 10 to 25% by weight, based on weight of final product, of a hexose, (b) is about from 10 to 25% by weight, based on weight of final product, of the corresponding alcohol of a hexose, and (c) is about from 5 to 18% by weight, based on weight of final product, of a disaccharide, to give a milk product, forewarming the milk product, concentrating the forewarmed milk product, homogenizing the concentrated, forewarmed milk product, and sterilizing and packaging the homogenized concentrated milk product by a high temperature-short time method to give as a final product a packaged sterilized concentrated milk product of improved storage stability.

8. The process of claim 7 in which the polyhydric compound is a hexose.

9. The process of claim 8 in which the hexose is dextrose.

10. The process of claim 7 in which the polyhydric compound is a disaccharide.

11. The process of claim 10 in which the disaccharide is lactose.

12. The process of claim 10 in which the disaccharide is sucrose.

13. A process comprising dispersing in a milk about from 10 to 25% by weight, based on the final product, of a hexose alcohol to give a milk product, forewarming said milk product, concentrating the forewarmed milk product, and sterilizing and packaging the concentrated milk product by a high temperature-short time method to give, as a final product, a packaged, sterilized, concentrated milk product of improved storage stability.

14. The process of claim 13 wherein the hexose alcohol is sorbitol.

15. A process comprising dispersing in a milk about from 10 to 25% by weight, based on the weight of the final product, of a hexose alcohol, to give a milk product, forewarming said milk product, concentrating the forewarmed milk product, homogenizing the concentrated, forewarmed milk product, and sterilizing and packaging the homogenized, concentrated milk product by a high temperature-short time method to give, as a final product, a packaged, sterilized, concentrated milk product of improved storage stability.

16. The process of claim 15 wherein the hexose alcohol is sorbitol.

References Cited in the file of this patent

UNITED STATES PATENTS

| | | |
|---|---|---|
| 2,565,085 | Peebles | Aug. 21, 1951 |
| 2,827,381 | Boyd | Mar. 18, 1958 |

OTHER REFERENCES

Hunziker: "Condensed Milk and Milk Powder," 7th ed., pub. by author, La Grange, Ill., 1949, pp. 197, 198 and 209.